Oct. 22, 1929.  T. E. MURRAY, JR  1,732,241
PRODUCTION OF VALVES
Filed April 8, 1927  2 Sheets-Sheet 2
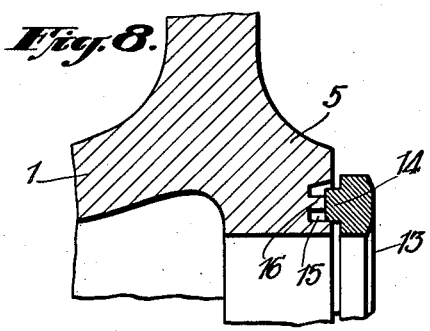
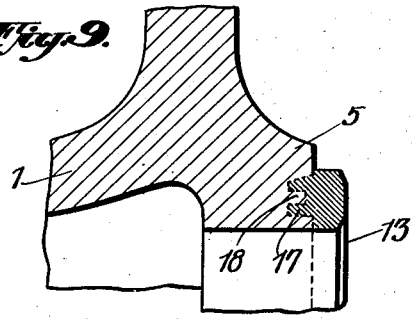
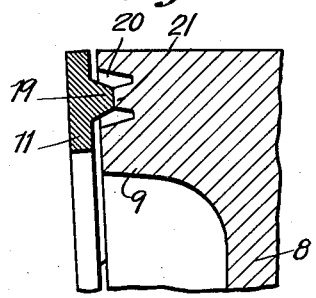
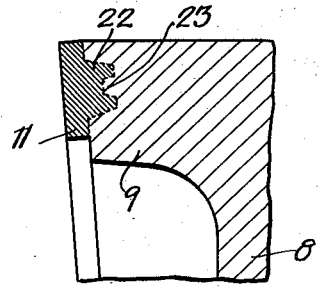
INVENTOR
Thomas E. Murray Jr.
BY D. Anthony Usina, ATTORNEY Patented Oct. 22, 1929

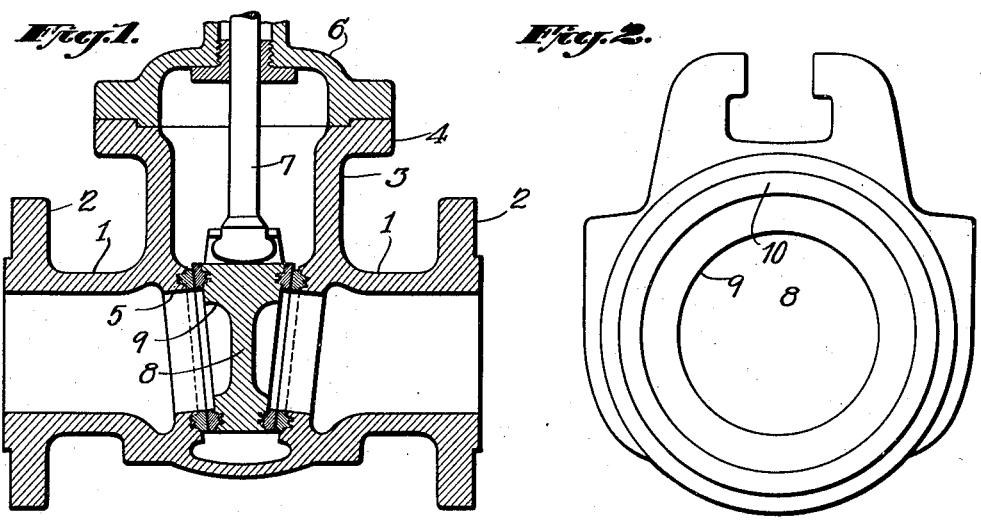
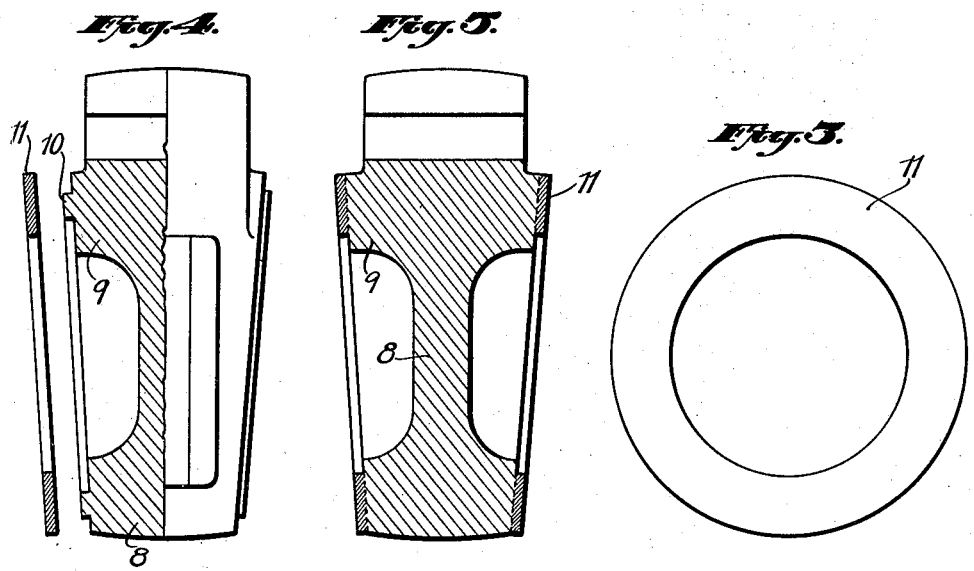
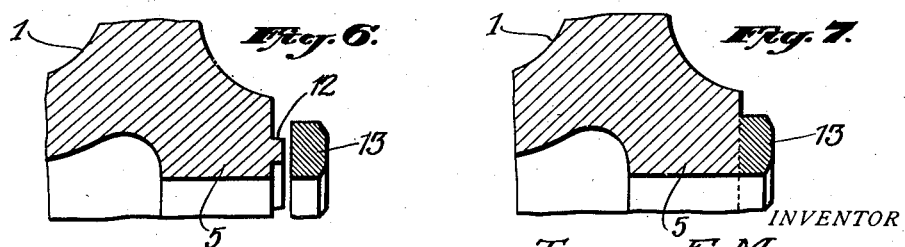

1,732,241

UNITED STATES PATENT OFFICE

THOMAS E. MURRAY, JR., OF BROOKLYN, NEW YORK

PRODUCTION OF VALVES

Application filed April 8, 1927. Serial No. 181,959.

My invention aims to provide certain improvements in valves and particularly in the manner of securing valve seats in place.

The accompanying drawings illustrate embodiments of the invention.

Fig. 1 is a longitudinal section of a gate valve.

Fig. 2 is a face elevation of the gate.

Fig. 3 is a face elevation of the seat to be applied thereto.

Fig. 4 is a longitudinal section of these two parts before welding.

Fig. 5 is a similar section showing the seats welded on to the gate.

Figs. 6 and 7 are views similar to Figs. 4 and 5 showing part of the body or casing and its seat.

Figs. 8 and 9 are enlarged details showing another method of securing the body or casing seat.

Figs. 10 and 11 are similar views showing the gate and its seat united in the same way.

At present the common practice is to cut a thread on the valve seat and screw it into a corresponding thread in the valve body or other support. The seat or wearing portion of the valve proper is sometimes secured to the valve stem by rolling it into place. With these methods the valve seat has to be of a comparatively soft metal, soft enough to be machined.

According to my invention I use a harder metal such as special alloys and weld them to their supports. The seats may be heat treated before welding or after. It is possible to weld a seat of very much harder metal than can be threaded or rolled. I propose for example, to weld a seat of steel having a hardness of five hundred Brinnell which is much harder than anything that can be machined or rolled. And I may secure an even harder seat by using special hardening alloys and hardening them by heat treatment after welding. After the welding and heat treatment the faces of the seats may be ground for perfect accuracy, thus removing irregularities which might be due to the heat treatment and to the welding operation. The invention is shown only in connection with a gate valve but is applicable to valves of various other styles.

Referring to Fig. 1, the valve body or casing comprises branches 1 with flanges 2 and a branch 3 with a flange 4, these parts being formed integrally with seat supporting rings 5. The bonnet 6 carries the usual packing for the stem 7. The latter carries at its lower end a disc 8 having its opposite faces in the form of rings 9 to which the seats are to be applied.

The casing and the gate described are preferably made of drop forgings, for valves which are to withstand high pressure, but they are often made of cast steel or other metal.

The seats are welded to the supports described. Preferably the Murray resistance method of welding is used in which a current of extremely high density (in amperes per square inch of the welded area) is passed across the joint for a very brief measured period of time while the parts are pressed together.

I secure a better weld by shaping the support with a narrow projecting ring on the joint face. For example, Figs. 2 and 3 show a narrow projecting ring 10 placed to register approximately with the middle of the seat ring 11. Now when the parts are pressed together and the current passed, the current is concentrated over the rib 10 in the initial stage, and this is melted away by the time that the principal surfaces come to welding condition and are brought together, the resulting weld appearing substantially as in Fig. 5. In this way the seat rings can be economically stamped out of rolled sheets in a comparatively soft condition. After welding the entire article is heat treated to harden the seats.

According to Fig. 6 the ring 5 of the casing is also provided with a circular narrow rib 12 placed to engage the central portion of the seat ring 13 and the parts are welded as above described, the product appearing as in Fig. 7. The casing will generally be of cast iron and the seats 13 hardened before welding. But the casing may be drop forged like the gate, and the latter may also be a casting, and in any case the seats may be hardened either before or after welding, or may be a special grade of very hard metal without requiring special treatment.

Another expedient for securing a good joint is illustrated in Figs. 8 to 11. In Fig. 8 the seat 13 is formed with a flange 14 entering a groove 15 in the supporting ring, in the bottom of which groove there is an upstanding flange 16. Now when the parts are pressed together and the current passed, the flanges will be somewhat distorted to the shapes shown at 17 and 18, Fig. 9. Thus the parts are not only welded but are also interlocked by the overlapping projections 17 and 18.

The same method may be pursued for the gate. See Figs. 10 and 11. In this case, the valve ring 11 is formed with a flange 19 entering a groove 20 in the supporting ring 9, from the bottom of which groove projects a flange 21. At the end of the welding operation the parts will have approximately the shape of Fig. 11, with the valve seat having projections 22 interlocked with a projection 23 from the supporting ring.

After the seats are welded to their supports, the working faces are ground to finished shape, which eliminates any inaccuracies due to preliminary or later heat treatment or to the welding operation. The product is a valve, the seats of which can be made as hard as desired while preserving the toughness of the casing and the movable part which is generally inconsistent with hardness. And these qualities are secured in a very economical way.

In some cases it is desirable to use rings of brass or similar metal which, though it has not the advantage of hardness, is practically non-corrodible and very durable and for that reason is important in valves for certain special uses. Such brass seats are generally required in connection with cast iron casings. The invention covers a valve made by the welding of such a seat of brass or similar metal as well as the valves above described having a seat of hard steel.

This application is a continuation with certain additions, of a previous application filed by me April 15, 1925, No. 23,174.

Various other modifications may be made by those skilled in the art without departing from the invention as defined in the following claims.

What I claim is:—

1. In the production of a valve, the method which consists in making a ring-shaped wearing portion of one metal and an annular support therefor of another metal, shaping the joint face of one of said parts with a ring of reduced width projecting beyond said face, welding the wearing portion to its support by passing a welding current between them while pressing them together so as to destroy said projecting ring and weld the faces of the parts to each other.

2. In the production of a valve, the method which consists in making an annular support of one metal and a ring-shaped wearing portion of a second metal adapted to be hardened by heat treatment, welding the wearing portion to the support by pressing the parts together while passing a welding current across the joint, heat treating to harden the wearing portion and grinding the latter after hardening, to bring it to finished shape.

In witness whereof, I have hereunto signed my name.

THOMAS E. MURRAY, JR.